United States Patent [19]

Spengler

[11] 4,383,004
[45] May 10, 1983

[54] THERMOCOUPLE BIMETAL HAVING A HIGH APPLICATION LIMIT, AND METHOD OF PRODUCING THE SAME

[75] Inventor: Heinz Spengler, Pforzheim, Fed. Rep. of Germany

[73] Assignee: G. Rau GmbH & Co., Pforzheim, Fed. Rep. of Germany

[21] Appl. No.: 255,263

[22] Filed: Apr. 17, 1981

[30] Foreign Application Priority Data

May 3, 1980 [DE] Fed. Rep. of Germany ....... 3017044

[51] Int. Cl.³ .................. B32B 15/01; B32B 15/08
[52] U.S. Cl. .................... 428/619; 148/127; 148/142; 428/682; 428/685
[58] Field of Search .............. 428/678–685, 428/616–619; 75/123 N, 123 K, 123 M, 134 F, 124; 148/127, 142

[56] References Cited

U.S. PATENT DOCUMENTS 2,048,163  7/1936  Pilling et al. ............... 75/124 FE
3,829,296  8/1974  Charest ....................... 428/617
4,131,720 12/1978  Spangler ..................... 428/619

Primary Examiner—Michael L. Lewis
Attorney, Agent, or Firm—Wenderoth, Lind & Ponack

[57] ABSTRACT

A thermocouple bimetal of the type made from a metallic component of high thermal expansion which is bonded to a component of low thermal expansion and in which said component of low thermal expansion consists of a thermally age-hardenable iron-nickel-titanium alloy with 26 to 55% nickel, 1–5% free titanium, 0–16% cobalt, remainder iron including impurities conditioned by the melt, and said component of high thermal expansion consists of a thermally age-hardenable iron-nickel-manganese-titanium alloy with 14–26% nickel, 3–10% manganese, 1–5% free titanium, remainder iron including impurities conditioned by the melt. An advantageous method of producing such a bimetal is also described.

2 Claims, 1 Drawing Figure

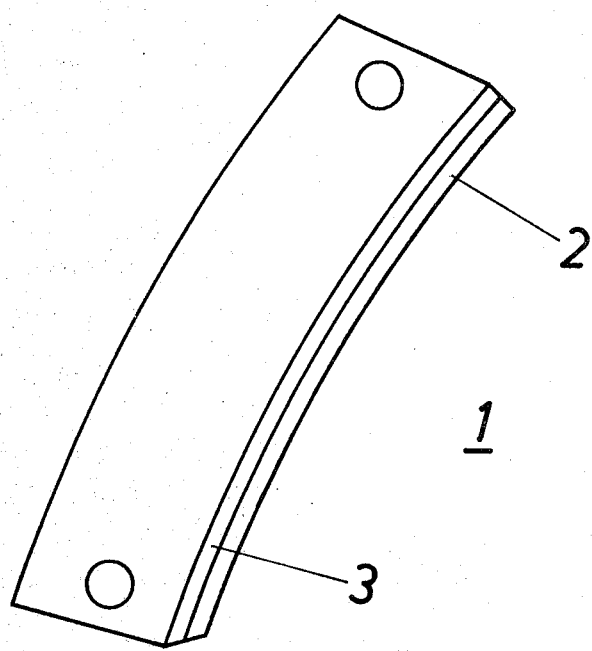

THERMOCOUPLE BIMETAL HAVING A HIGH APPLICATION LIMIT, AND METHOD OF PRODUCING THE SAME

The invention relates to a thermocouple bimetal having a high application limit, and in which at least one metallic component of high thermal expansion is bonded to at least one thermal component of low thermal expansion, which latter consists of a thermally age-hardenable iron-nickel-titanium alloy with 26 to 55% nickel, 1–5% free titanium, 0–16% cobalt, remainder iron, including impurities conditioned by the melt. Furthermore, a method of producing a shaped part from such thermocouple bimetal is disclosed.

German A/S 26 13 954 describes a thermocouple bimetal with a high application limit, which has a particularly good specific thermal deflection of $8-12\times10^{-6}/K$ and which, at a given final cold-rolling reduction, enables the application limit to be adjusted by age-hardening at a temperature which determines the application limit. The component of low thermal expansion consists of a thermally age-hardenable iron-nickel-titanium alloy with 26 to 55% nickel, 0–5% free titanium, 0–16% cobalt, remainder iron, including impurities determined by the melt. Depending upon the degree of cold-rolling reduction, thermal age-hardening is carried out between 550° and 750° C.

The present invention seeks to improve further the favourable properties of the thermocouple bimetal described in German A/S 26 13 954 and to combine a high specific thermal deflection with a high application limit, optionally adjustable during the process of manufacture, as well as with high strength.

In accordance with a first aspect of the invention there is provided a thermocouple bimetal having a high application limit, comprising at least one metallic component of a high thermal expansion, at least one component of low thermal expansion which is bonded to the metallic component, said component of low thermal expansion consisting of a thermally age-hardenable iron-nickel-titanium alloy with 26 to 55% nickel, 1–5% free titanium, 0–16% cobalt, remainder iron including impurities conditioned by the melt, and said component of high thermal expansion consisting of a thermally age-hardenable iron-nickel-manganese-titanium alloy with 14–26% nickel, 3–10% manganese, 1–5% free titanium, remainder iron including impurities conditioned by the melt.

A thermocouple bimetal having the above-stated components can have a specific thermal deflection of $12-15\times10^{-6}/K$. With this material, a readily adjustable application limit can be achieved by the thermal age-hardening of the components within the range 600° to 700° C. Of particular importance is the fact that the thermocouple bimetal still has the same high strength within these temperature ranges.

An advantageous composition can be obtained if the component of low thermal expansion is a thermally age-hardenable iron-nickel-titanium alloy with 30–55% nickel, 1–5% free titanium, remainder iron, including impurities determined by the melt.

In a further advantageous system, the component of low thermal expansion is a thermally age-hardenable iron-nickel-cobalt-titanium alloy with 26–39% nickel, 3–16% cobalt, 1–5% free titanium, remainder iron, including impurities determined by the melt.

It may also be advantageous if the titanium content is replaced, at least partially, by an aluminium content in at least one of the metallic components.

An advantageous composition can be provided if the component of high thermal expansion is a thermally age-hardenable iron-nickel-manganese-titanium alloy with 14% nickel, 9% manganese, and 2% free titanium, the remainder iron, and if the component of low thermal expansion is a thermally age-hardenable iron-nickel-cobalt-titanium alloy with 34% nickel, 6% cobalt, 1.5% free titanium, 0.03% maximum carbon, remainder iron.

Yet another advantageous system can be obtained if the component of high thermal expansion is a thermally age-hardenable iron-nickel-manganese-titanium alloy with 14% nickel, 9% manganese and 2% free titanium, remainder iron, and if the component with low thermal expansion is a thermally age-hardenable iron-nickel-cobalt-titanium alloy with 32.5% nickel, 14.5% cobalt, 1.6% free titanium, 0.03% maximum carbon, remainder iron.

According to a second aspect of the invention there is provided a method of producing a thermocouple bimetal shaped part from the thermocouple bimetal of this invention, said method comprising producing the thermocouple bimetal by roll-cladding followed by cold-rolling, to give a final cold-rolling reduction of 20 to 75%, and ageing the thermocouple bimetal, prior to assembly, at a temperature that causes thermal age-hardening of the components. Optionally, annealing is carried out between cold rolling passes.

Advantageously, the roll-cladding and the cold-rolling can be carried out up to the usual final cold-rolling reduction of 20–30% and the ageing or thermal age-hardening can be carried out within a period of 2–30 hours over a temperature range of 600° to 700° C.

The method of this invention can also be carried out by producing, from the components, and by roll-cladding followed by cold-rolling with inter-pass annealing at 800°–1200° C., a semi-product having a final cold-rolling reduction of 20–30% that is usual for thermocouple bimetals. Inter-pass annealing constitutes a normal step in the process of producing thermocouple bimetal parts, which step is described in Archiv fur technisches Messen, Vol. 11, 1972, page 217, for example.

From this semi-product, which exhibits good cold-deformability, it is possible to produce thermocouple bimetal shaped parts as strips or discs or in other forms depending upon the intended application. These shaped parts are adjusted as regards their high strength and application limit only in the ready-to-assemble condition, this being achieved by linking the usual ageing of the thermocouple bimetal prior to assembly with the thermal age-hardening of the components. Ageing prior to assembly results in anticipation of the changes in shape that are proportional to the temperature.

Using the composition of thermocouple bimetal in accordance with the invention and with usual cold-shaping, it is generally possible to achieve adequate thermal age-hardening of the components in as little as 2–3 hours at temperatures of 600° to 700° C. If the degree of cold-rolling following final shaping of the semi-product can be increased to 50–75%, as is possible for the production of flat stamped parts of thermocouple bimetal, adequate thermal age-hardening is achieved upon ageing for as little as one hour at temperatures of 550° to 650° C. In all cases, adequate thermal age-hardening is achieved in this temperature range within 10 hours.

EXAMPLE

A thermocouple bimetal having a component of high thermal expansion and made of an iron-nickel-manganese-titanium alloy having 14% nickel, 9% manganese, 2% free titanium, remainder iron, and a component of low thermal expansion made of an iron-nickel-cobalt-titanium alloy with 34% nickel, 6% cobalt, 1.5% free titanium, remainder iron—the thickness ratio of the layers of the components being 1:1—exhibited, as a semi-product having a 20 to 65% degree of cold-rolling, a specific thermal deflection of $13.8 \times 10^{-6}$/K, a specific electrical resistance of $0.78 \mu\Omega \times m$, a tensile strength of 750 to 900 N/mm$^2$, a yield point of 700 to 850 N/mm$^2$, a fracture elongation of 20 to 5%, and a permissible bending stress of 200 to 300 N/mm$^2$ at 20° C. By ageing/age-hardening for 1 to 20 hours at 600° to 650° C., the specific thermal deflection was increased to $14.3$–$14.5 \times 10^{-6}$/K. The tensile strength, determined after ageing/age-hardening at 20° C. was 1000 to 1200 N/mm$^2$, the yield point 900 to 1180 N/mm$^2$, the fracture elongation 2 to 5% and the permissible bending stress 450 to 600 N/mm$^2$. At 300° C., the permissible bending stress dropped to approximately 350 N/mm$^2$, and at 500° C. to approximately 200 N/mm$^2$, at 600° C. to approximately 100 N/mm$^2$, and at 700° C. to approximately 50 N/mm$^2$. For the purpose of setting a stable application limit of 600° C., ageing and age-hardening of the ready-to-assemble thermocouple bimetals were carried out for at least 2 to 3 hours at 600° C., and for an application limit of 700° C., for at least 2 to 3 hours at 650° C.

BRIEF DESCRIPTION OF THE DRAWING

The accompanying drawing illustrates a thermocouple bimetal shaped part 1, which consists of two strip-like components 2 and 3 of the stated kind. The dimensions of the original are approximately 80×10×0.5 mm.

I claim:

1. A thermocouple bimetal having a high application limit, comprising at least one metallic component of high thermal expansion, and at least one component of low thermal expansion which is bonded to said metallic component, said component of high thermal expansion being a thermally age-hardenable iron-nickel-manganese-titanium alloy with 14% nickel, 9% manganese and 2% free titanium, remainder iron, and said component of low thermal expansion being a thermally age-hardenable iron-nickel-cobalt-titanium alloy with 34% nickel, 6% cobalt, 1.5% free titanium, 0.03% maximum carbon, remainder iron.

2. A thermocouple bimetal having a high application limit, comprising at least one metallic component of high thermal expansion, and at least one component of low thermal expansion which is bonded to said metallic component, said component of high thermal expansion being a thermally age-hardenable iron-nickel-manganese-titanium alloy with 14% nickel, 9% manganese and 2% free titanium, remainder iron, and said component of low thermal expansion being a thermally age-hardenable iron-nickel-cobalt-titanium alloy with 32.5% nickel, 14.5% cobalt, 1.6% free titanium, 0.03% maximum carbon, remainder iron.

* * * * *